United States Patent [19]

Koehler et al.

[11] 4,428,423
[45] Jan. 31, 1984

[54] WELL SCREEN END FITTING ASSEMBLY AND METHOD OF MAKING SAME

[75] Inventors: Raymond A. Koehler, Anoka; Bernard M. Hanson, Excelsior, both of Minn.

[73] Assignee: UOP Inc., Des Plaines, Ill.

[21] Appl. No.: 375,782

[22] Filed: May 6, 1982

[51] Int. Cl.³ .......................................... E21B 43/08
[52] U.S. Cl. ................................ 166/231; 210/497.1; 29/163.5 CW; 228/182
[58] Field of Search ............... 166/231, 232, 233, 227, 166/230, 234, 236; 175/314; 29/163.5 CW; 210/497.1; 228/178, 182

[56] References Cited

U.S. PATENT DOCUMENTS

| | | | |
|---|---|---|---|
| 1,862,838 | 1/1931 | Willers | 166/231 |
| 2,046,457 | 7/1936 | Johnson | 166/8 |
| 2,046,458 | 7/1936 | Johnson | 166/231 |
| 2,046,460 | 7/1936 | Johnson | 219/4 |
| 2,346,647 | 4/1944 | Bennison | 210/497.1 |
| 2,682,309 | 6/1954 | Banchback | 166/231 |
| 3,584,685 | 6/1971 | Boyd | 166/231 |
| 3,883,162 | 5/1975 | Colburn | 166/231 |
| 3,937,281 | 2/1976 | Harnsberger | 166/233 |
| 3,958,634 | 5/1976 | Smith | 166/233 |

Primary Examiner—James J. Leppink
Assistant Examiner—Hoang C. Dang
Attorney, Agent, or Firm—James R. Hoatson, Jr.; Barry L. Clark; William H. Page, II

[57] ABSTRACT

End fitting assembly for a spiral wire wound well screen includes a fitting portion which is internally threaded at one end to threadedly engage with a plurality of external wire wraps of the well screen which are wound around a plurality of longitudinal support rods at a greater pitch than the main body of the screen. Preferably, the longitudinal support rods are welded at their tips to the interior surface of the fitting. The assembly technique greatly increases the tensile strength of the joint between the screen and fitting and can be equal to a combination of the individual strengths of a conventional welded fitting and a threaded fitting. Where utmost joint strength is not necessary and welding would not be desirable for reasons such as corrosion prevention, the wire wrap threads can provide all of the joint strength.

7 Claims, 2 Drawing Figures

WELL SCREEN END FITTING ASSEMBLY AND METHOD OF MAKING SAME

BACKGROUND OF THE INVENTION

The invention relates to cylindrical well screens and particularly to fittings for such screens which are used to attach one screen to another or to a length of pipe. A conventional well screen of the type shown in Johnson U.S. Pat. No. 2,046,457 has a trapezoidal-shaped surface-forming wire spirally wound about a plurality of longitudinal support rods to which it is welded at every joint. Preferably, a screen should have a substantial tensile strength to resist the forces applied to it from underlying elements in a pipe string or when the screen is being removed from a well and such strength is, of course, provided only by the longitudinal support rods. However, even where such rods are produced by cold-rolling and work-hardening to provide tensile strengths in excess of 150,000 psi, the act of welding the ends of the rods to a fitting member produces an annealing of the rods which effectively destroys the strength increase gained by the initial work-hardening. U.S. Pat. No. 2,682,309 shows a fitting being threaded and/or brazed to the support bars of a screen beyond its slotted region. U.S. Pat. No. 1,862,838 also shows a fitting threaded to the support rods beyond the wrapped wire slotted region. The thread grooves in the rods for the fitting are of identical pitch to the grooves provided for the wrap wire. An internal longitudinally slotted, cylindrical sleeve backs up the rod ends in the region opposite the fitting.

SUMMARY OF THE INVENTION

It is an object of the present invention to provide a well screen and fitting assembly and a method of making same which will provide a joint strength which is far superior to that achieved by known constructions.

Another object is to provide an assembly which is automatically self-aligning.

These and other objects and advantages are attained by the present invention in which a cylindrical fitting member is provided with internal threads in one portion thereof which are adapted to threadedly engage a helical groove defined by the space between a plurality of wraps of an end portion of the helically wound wire that forms the slotted main body portion of a well screen. The pitch of said plurality of wraps and of said internal threads is greater than the pitch of the wire wraps forming the main body portion of the screen. After the said end portion of the well screen is threadedly engaged with the threaded portion of the fitting, the ends of the longitudinal support rod portions of the screen are welded to the interior of the fitting member. The well screen is produced to have different pitches of slot spacings in its main body portion and at at least one end by merely changing the gearing or similar structure relating the winding pitch to the rotational movement on the screen winding machine. Machines capable of varying the slot spacing are well known, and an example can be seen in Johnson U.S. Pat. No. 2,046,460. Preferably, the pitch of the profile wire wraps in the end portion of the screen is selected to equal a value common to the threading machine used to form the thread on the fitting member. In order to provide good thread contact and resistance to tensile loads despite wide dimensional tolerances between the screen and fitting, it is preferred that the fitting threads be of a generally square or non-tapered shape. Ideally, the pitch change during the winding of the screen should occur in one revolution and such equipment could be built, but conventional screen winding equipment seems to require about two revolutions to make the transition. To prevent particles from passing through the resulting transition screen slot that is wider than the main body slots but not as wide as the slots which mate with the fitting threads, the transition slot can be sealed closed by various techniques such as gaskets or various fillers. Alternatively, the fitting and screen can be carefully dimensioned so as to overlie each other by a spacing distance less than the width of a body screen slot. It is also possible to roll the end surface of the fitting after assembly so that the portion which extends beyond the threads and overlies the body portion of the screen will be reduced in internal diameter to close down the gap. Where the pitch change can be made in one revolution, it would also seem to be possible to relate the inside depth of the fitting and the end plane of the fitting threads to the angular position of the thread starting point on the screen and to the angular position of the transition slot so that the feathered outermost fitting thread would close the transition slot. To provide maximum tensile strength to the assembly, the end of each of the longitudinal support rods is welded to the interior surface of the fitting. For best results, the end of the screen is preferably cut off square and parallel with an internal shoulder in the fitting. The advantage of attaching the fitting to the screen by both the aforementioned threading technique and by welding was proven in tests made with several 3-inch diameter screens. A sample in which the fitting was held only by its engagement with three wraps of wire broke in a tensile test at 26,000 pounds. Another sample in which the fitting was only welded, in the conventional manner, failed at approximately 50,000 pounds. A third sample, made in accordance with the invention, with threaded interengagement of three wraps of the screen with the fitting and with the screen's rod ends welded to the fitting, failed at 76,000 pounds. Thus, the threaded and welded assembly provided a strength equal to the algebraic sum of the strengths of the two other fastening techniques used individually. Later tests with an engagement of six wrap wires with the fitting threads showed that the additional threads increased the failure strength to 50,000 pounds. When an identical six wrap sample was also welded, it failed at about 90,000 pounds, but at a point inside the screen. This indicated that the joint was stronger than the screen rods. It would appear that at least two wraps of engagement should be provided, but that four to six wraps are preferred for maximum strength.

Another advantage of the threaded connection as compared to the use of welding alone is that it insures perfect alignment between the screen and fitting and thus eliminates the need for special jigs and fixtures to hold the screen and fitting as they are welded. Where high joint strength is not essential, it would be possible to eliminate the rod to fitting welds. Such a non-welded joint would be particularly useful where the nature of the fluids to be passed through the screen and fitting could cause corrosion if the structural integrity of their materials were to be disturbed by welding.

DESCRIPTION OF THE PREFERRED EMBODIMENT

Figure 1:
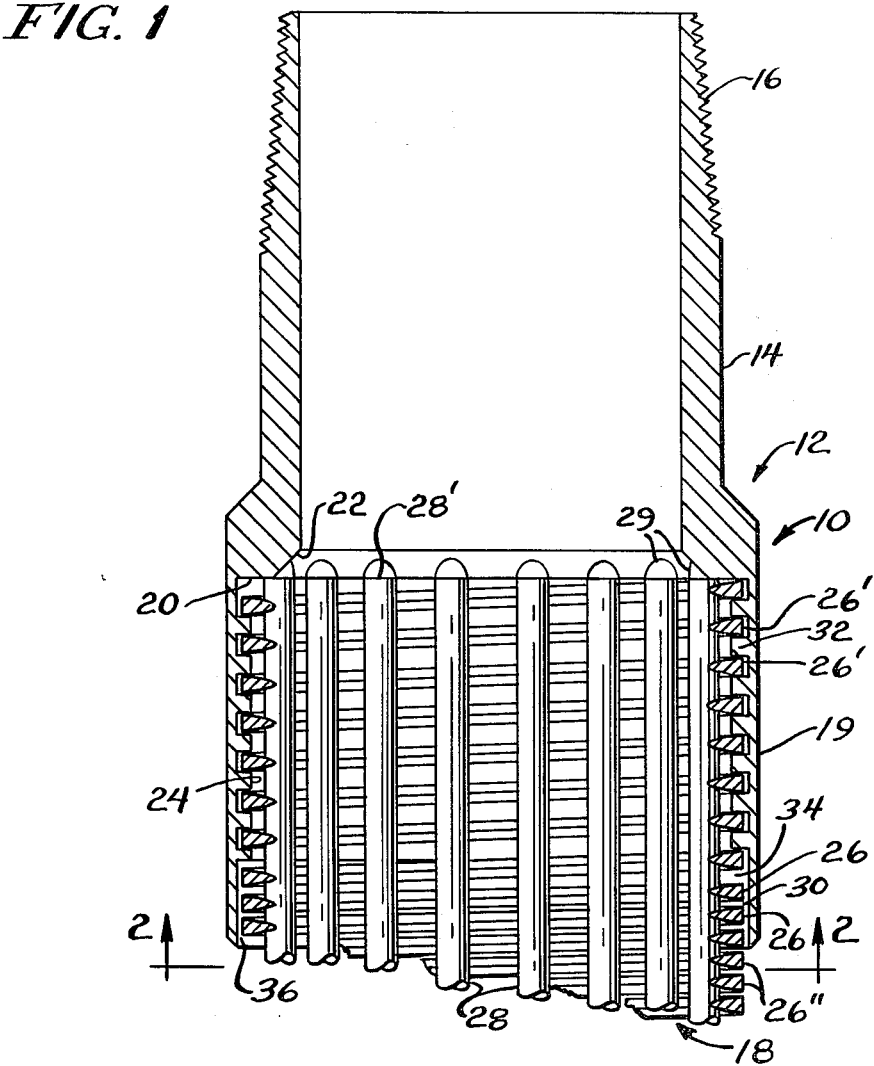
FIG. 1 is an axial cross-sectional view of the fitting assembly.
Figure 2:
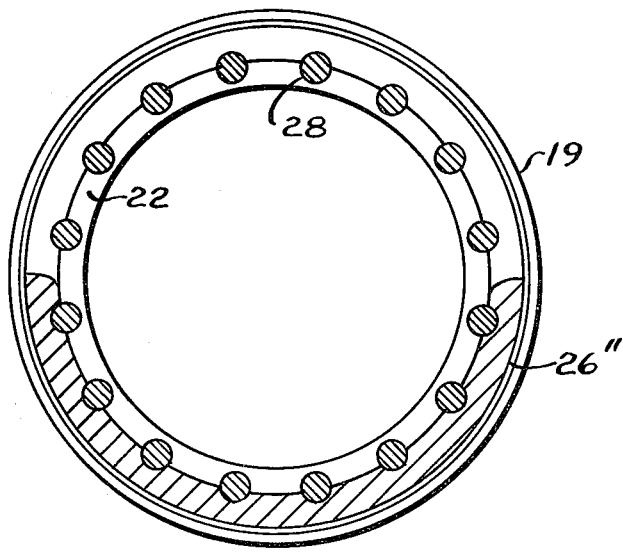
FIG. 2 is a sectional view taken on line 2—2 of FIG. 1.

The improved fitting assembly is indicated generally at 10 in FIG. 1. The assembly includes a fitting member indicated generally at 12 which could have variously shaped ends, but is shown with an upper cylindrical sleeve portion 14 and a threaded upper end portion 16 by which it may be attached to a length of threaded pipe or other element of a pipe string from which the well screen member 18 is to depend. The lower end of the fitting 12 has a generally cylindrical portion 19 and a flat internal shoulder surface 20 which is chamfered at 22. The cylindrical portion 19 is shown as being formed with six convolutions of internal theads 24 having a generally square cross-section. The lower end of the cylindrical portion 19 is preferably of sufficient axial extent to cover a plurality of wire wraps 26 of the screen member 18.

The screen member 18 is of generally conventional construction in that the helical wire wraps 26 are welded to longitudinal support rods 28. However, the wrap wire 26 is wound so that the pitch or distance between identical portions of adjacent wraps is greater at the upper end of the screen where wrap wires 26' threadedly engage fitting threads 24, than it is at the bottom of the screen where wire wraps 26" are positioned at a much closer pitch. The slot opening or space 30 between adjacent wraps 26", 26" is much smaller than the space 32 between adjacent wraps 26', 26' and is sufficiently small that it will prevent the passage of unwanted particles in a radically inward direction.

The well screen member 18 is assembled to the fitting member 12 by threading the larger pitch endmost wire wraps 26' into complementary engagement with the fitting threads 24 until the upper tips 28' of the support rods 28 contact the internal ledge or shoulder surface 20. The upper tips 28' are then welded by small weld beads 29 to the chamfered surface 22 of the fitting 12 to complete the assembly. Where the screen winding machine used to make the screen member 18 requires more than a single revolution of the screen to go from a winding pitch providing the space 30 to a winding pitch providing the space 32, it is desirable to make sure that the intermediate width transition space 34 cannot allow the entry of particles which would normally be too large to pass through space 30. The entry of such particles can be prevented by manufacturing the fitting 12 to a close tolerance such that radial space 36 is no larger than space 30. Alternatively, the lower end of sleeve 19 could be rolled inwardly to a smaller dimension or the space 34 could be filled with an appropriate filler material.

We claim as our invention:

1. An improved well screen and end fitting assembly having enhanced tensile strength comprising a cylindrical well screen portion having a helically wound outer wire portion welded or otherwise affixed to a plurality of longitudinally extending rod portions, said outer wire portion being wound so as to define relatively narrow width slot portions of a first desired pitch for at least the major portion of its length and relatively wider width slot portions of a second desired pitch for a plurality of revolutions at at least one end thereof; and a generally cylindrical end fitting member having a plurality of internal threads formed at one end thereof which are adapted to be threadedly placed in complementary engagement with the outer wire portion which defines said wider width slot portions of said well screen portion.

2. The assembly of claim 1 wherein the ends of said rod portions at said at least one end of said well screen portion are welded to the interior of said end fitting member.

3. The assembly of claim 2 wherein said outer wire portion is wound at said second desired pitch for at least three revolutions and is adapted to be engaged by at least three internal threads formed on said end fitting member.

4. The assembly of claim 3 wherein said outer wire portion is wound at said second desired pitch for between four and six revolutions and is adapted to be engaged by between four and six internal threads formed on said end fitting member.

5. The assembly of claim 4 wherein said internal threads have a square cross-sectional profile.

6. A method of making a well screen end fitting joint of enhanced tensile strength between a well screen fitting member and the end of a helically wrapped wire well screen having longitudinal support rods comprising the steps of forming the well screen by helically winding the wire around the longitudinal support rods so that a plurality of the wraps of wire at at least one end of the screen are spaced at a pitch which is greater than the pitch of the wraps of wire forming the main body of the screen, the pitch of the wraps of wire at said at least one end being equal to the pitch of a plurality of female threads which are formed internally of the fitting member; threading said at least one end of said screen into interengaging contact with said female threads over a plurality of revolutions; and welding said fitting member to the ends of said longitudinal support rods.

7. A method in accordance with claim 6 wherein said screen and fitting are threaded into interengaging contact over at least three revolutions.

* * * * *